Patented Dec. 31, 1940

2,226,541

UNITED STATES PATENT OFFICE 2,226,541

CEMENT AND METHOD OF PREPARING THE SAME

Arthur W. Browne, Akron, Ohio, assignor to The B. F. Goodrich Company, New York, N. Y., a corporation of New York No Drawing. Application April 27, 1938, Serial No. 204,618

3 Claims. (Cl. 260—5)

This invention relates to compositions containing both rubber and the polymerized chlorobutadiene known as neoprene, and has as its object to provide a method of forming solutions thereof.

I have discovered that after dissolving rubber in gasoline and neoprene in an aliphatic ester of a lower fatty acid, the solutions may be mixed in any desired proportions without coagulation of either the rubber or neoprene. By this method, cements are prepared from which may be deposited films comprising a homogeneous mixture of rubber and neoprene in any desired proportions.

The neoprene may be dissolved in any liquid aliphatic ester of a lower fatty acid, the alkyl esters of fatty acids containing not more than five carbon atoms being preferred. Among the preferred solvents are isopropyl acetate, butyl acetate, amyl acetate, butyl propionate, and butyl butyrate.

Certain members of the class such as ethyl acetate, which are rather poor solvents when used alone are very useful when used with other members such as butyl acetate to increase the volatility of the solvent.

To illustrate the method of this invention, 5% solutions of rubber in gasoline and neoprene in amyl acetate were prepared. They were mixed in the following proportions by volume.

|  | A | B | C | D | E | F | G |
|---|---|---|---|---|---|---|---|
| Rubber cement | 20 | 30 | 40 | 50 | 60 | 70 | 80 |
| Neoprene cement | 80 | 70 | 60 | 50 | 40 | 30 | 20 |

No precipitation or coagulation occurred although it was absolutely impossible to dissolve mixtures of rubber and neoprene in mixtures of gasoline and butyl acetate. After two hours, cement A separated into two layers with a layer of neoprene cement on the top, and after a day all of the cements except G had separated. There was no coagulation of either the rubber or the neoprene however, and the layers were readily combined by simply stirring.

It is often desirable to deposit films containing compounded neoprene and rubber, a result which is readily obtainable by the method of this invention. The following composition was prepared:

| | |
|---|---|
| Neoprene | 41.80 |
| Magnesium oxide | 2.10 |
| Gas black | 42.90 |
| Cumar resin | 8.35 |
| Rosin oil | 4.00 |
| Phenyl-beta-naphthylamine | 0.85 |
| | 100.00 |

The following rubber composition was prepared:

| | |
|---|---|
| Rubber | 61.15 |
| Gas black | 22.20 |
| Zinc oxide | 3.00 |
| Hardwood pitch | 6.50 |
| Pine tar | 2.25 |
| Cottonseed fatty acid | 2.00 |
| Sulfur | 2.00 |
| Phenyl-beta-naphthylamine | 0.50 |
| Mercaptobenzothiazole | 0.40 |
| | 100.00 |

When the rubber composition is dissolved in gasoline and the neoprene composition is dissolved in butyl acetate, the two cements can be mixed in any desired proportions. From the resulting composition, a homogeneous neoprene-rubber film may be deposited upon the desired surface.

Rubber and neoprene are used in the appended claims in a generic sense to include rubber and neoprene whether or not admixed with pigments, softeners, fillers, vulcanizing agents, antioxidants, etc.

Although I have herein disclosed specific embodiments of my invention, I do not intend to limit myself solely thereto, for many modifications which will be apparent to those skilled in the art are within the scope of the invention as defined in the appended claims.

I claim:

1. The method which comprises dissolving rubber in gasoline, dissolving neoprene in amyl acetate, and mixing the solutions to give a cement containing rubber and neoprene.

2. The method which comprises dissolving rubber in gasoline, dissolving neoprene in butyl acetate, and mixing the solutions to give a cement containing rubber and neoprene.

3. The method which comprises dissolving rubber in gasoline, dissolving neoprene in a liquid alkyl ester of a lower fatty acid, said alkyl group containing from four to five carbon atoms and said acid containing not more than five carbon atoms, and mixing the solutions to give a cement containing rubber and neoprene.

ARTHUR W. BROWNE.